United States Patent
Morovic et al.

(10) Patent No.: US 11,134,176 B2
(45) Date of Patent: Sep. 28, 2021

(54) LOOKUP TABLE SMOOTHING

(71) Applicant: HEWLETT-PACKARD DEVELOPMENT COMPANY, L.P., Spring, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/641,595

(22) PCT Filed: Sep. 25, 2017

(86) PCT No.: PCT/US2017/053258
§ 371 (c)(1),
(2) Date: Feb. 24, 2020

(87) PCT Pub. No.: WO2019/059946
PCT Pub. Date: Mar. 28, 2019

(65) Prior Publication Data
US 2020/0228680 A1 Jul. 16, 2020

(51) Int. Cl.
*H04N 1/60* (2006.01)

(52) U.S. Cl.
CPC ......... *H04N 1/6019* (2013.01); *H04N 1/6033* (2013.01); *H04N 1/6058* (2013.01)

(58) Field of Classification Search
None
See application file for complete search history.

(56) References Cited

U.S. PATENT DOCUMENTS

| | | | |
|---|---|---|---|
| 5,699,491 A | 12/1997 | Barzel | |
| 6,522,427 B1 | 2/2003 | Bhattacharjya et al. | |
| 6,757,081 B1 * | 6/2004 | Fan | H04N 1/00002 358/2.1 |
| 7,254,270 B2 * | 8/2007 | Simske | G06K 9/00456 345/619 |
| 7,422,310 B2 * | 9/2008 | Simpson | H04N 1/00965 347/12 |
| 8,059,921 B2 * | 11/2011 | Frohlich | G11B 33/0488 382/321 |

(Continued)

FOREIGN PATENT DOCUMENTS

KR 20050111806 A 11/2005

OTHER PUBLICATIONS

Balaji et al., "Hierarchical Compression of Color Look Up Tables," Oct. 8, 2007, https://pdfs.semanticscholar.org/280f/46c51500095be58177808fff24208245c11a.pdf.

(Continued)

*Primary Examiner* — Anh-Vinh T Nguyen
(74) *Attorney, Agent, or Firm* — HP Inc. Patent Department

(57) ABSTRACT

Certain examples described herein relate to smoothing a lookup table for an imaging system. The lookup table comprises entries to map elements in a first color space to corresponding elements in a second color space. In certain cases, the entries of the lookup table are classified into a plurality of classes, each of the plurality of classes being based on a color space characteristic in the first color space or the second color space. Each of the plurality of classes of entries is sequentially smoothed.

15 Claims, 5 Drawing Sheets

(56) References Cited

U.S. PATENT DOCUMENTS

| | | | |
|---|---|---|---|
| 8,335,015 B2 | 12/2012 | Klassen et al. | |
| 8,860,747 B2 | 10/2014 | Bhaskaran et al. | |
| 10,558,879 B2* | 2/2020 | Pollard | G06K 9/20 |
| 2001/0053248 A1* | 12/2001 | Maeda | G06K 9/38 |
| | | | 382/165 |
| 2002/0145744 A1* | 10/2002 | Kumada | H04N 1/6033 |
| | | | 358/1.9 |
| 2006/0176529 A1* | 8/2006 | Ito | H04N 1/6033 |
| | | | 358/518 |
| 2007/0091337 A1* | 4/2007 | Morovic | H04N 1/6058 |
| | | | 358/1.9 |
| 2008/0063263 A1* | 3/2008 | Zhang | G06K 9/6209 |
| | | | 382/159 |
| 2008/0275890 A1* | 11/2008 | Chakrabarti | G06F 16/958 |
| 2008/0275901 A1* | 11/2008 | Chakrabarti | G06F 16/951 |
| 2010/0085605 A1* | 4/2010 | Shaw | H04N 1/644 |
| | | | 358/3.23 |
| 2011/0038010 A1 | 2/2011 | Chen et al. | |
| 2011/0063632 A1 | 3/2011 | Klassen et al. | |
| 2011/0249280 A1* | 10/2011 | Ito | H04N 1/6019 |
| | | | 358/1.9 |
| 2012/0218574 A1* | 8/2012 | Fukuda | H04N 1/6097 |
| | | | 358/1.9 |
| 2013/0054783 A1* | 2/2013 | Ge | H04L 43/0823 |
| | | | 709/224 |
| 2018/0268444 A1* | 9/2018 | Dong | G06F 16/951 |

OTHER PUBLICATIONS

HPDC, "International Search Report and Written Opinion," dated May 24, 2018, PCT App. No. PCT/US2017/053258, 8 p.

* cited by examiner

LOOKUP TABLE SMOOTHING

BACKGROUND

An imaging system may be associated with a color space, defined by colorants available to the imaging system for outputting an image. For example, a printing system may be associated with a color space, defined by colorants available to the printing system for deposition or application to a print medium. An example of a colorant color space is the Cyan, Magenta, Yellow, BlacK (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
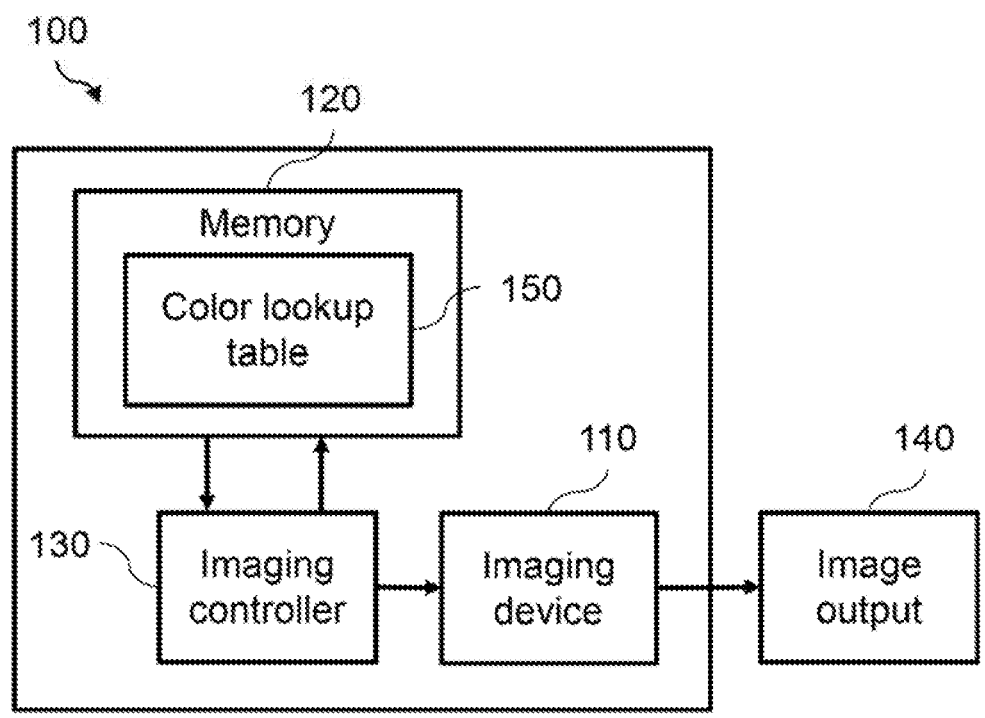
FIG. 1 is a schematic diagram of an imaging system according to an example.

Color can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant (or printing fluid, e.g. for a printing system); the International Commission on Illumination (CIE) 1931 XYZ color space, in which three variables ('X', 'Y' and 'Z' or 'tristimulus values') are used to model a color; the CIE 1976 (L*, a*, b*—CIELAB or 'LAB') color space, in which three variables represent lightness ('L') and opposing color dimensions ('a' and 'b'); and the YUV color space, in which three variables represent the luminance ('Y') and two chrominance dimensions (U and V).

Image data, e.g. representing an image to be output by an imaging system, may comprise color data represented in a first color space (which may be termed an "image color space"), such as image-level pixel representations in the RGB color space. In an imaging pipeline, e.g. a printing pipeline in examples where the imaging device is a printing device, a color separation process may be used to map from the image color space to a second color space (which may be termed an "intermediate color space" or a "target color space") for use in outputting an image, e.g. in a printing process. For example, the imaging system may be associated with a color space, e.g. a colorant color space defined by colorants available to the imaging system for outputting an image. In examples, the imaging system comprises an imaging controller to output a signal to an imaging device, e.g. an electronic visual display or projector. The imaging controller may be implemented using machine readable instructions and/or suitably programmed or configured hardware, e.g. circuitry. In these examples, the color space associated with the imaging system may be defined by color channels (i.e. colorants) available to the imaging device. In other examples, the imaging system comprises a printing system, and the colorant color space may therefore be defined by colorants available to the printing system for deposition or application to a print target.

The color separation process may utilize a data structure which stores a mapping from a color defined in the image color space to a set of parameters defined in the intermediate color space. For example, the mappings may be stored in a lookup table which is referenced by the color separation process to map from the image color space to the intermediate color space.

A printing system may utilize a halftoning process, and the intermediate color space may therefore be an area coverage space, such as the Neugebauer Primary area coverage (NPac) color space. An NPac vector in the NPac color space represents a statistical distribution of Neugebauer Primaries (NPs), e.g. NP vectors, over an area of a halftone. For example, in a simple binary (bi-level, i.e. two drop states: "drop" or "no drop") printing system, an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printing device or "printer") in a common addressable print area (e.g. a printable "pixel"). An NP may be referred to as a "pixel state".

In multi-level printers, e.g. where print heads can deposit N drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), available NPs can include C, CM, CMM, CMMM, etc.

Each NPac vector defines the probability distribution for colorant combinations for each pixel in the halftone (e.g. a likelihood that a particular colorant combination is to be placed at each pixel location in the halftone). In this manner, a given NPac vector defines a set of halftone parameters that are used in the halftoning process to map a color defined in the image color space to NP vectors to be statistically distributed over the plurality of pixels for a halftone. Moreover, the statistical distribution of NPs to pixels in the halftone serves to control the colorimetry and other print characteristics of the halftone.

Spatial distribution of the NPs according to the probability distribution specified in the NPac vector may be performed using a halftoning method. Examples of suitable halftoning methods include matrix-selector-based PARAWACS (Parallel Random Area Weighted Area Coverage Selection) techniques and techniques based on error diffusion. An example of a printing system that uses area coverage representations for halftone generation is a Halftone Area Neugebauer Separation (HANS) pipeline.

As mentioned, during an imaging process, a plurality of color mappings may be accessed. Each color mapping provides a mapping from an element, e.g. a color value, in a first color space to a corresponding element, e.g. color value, in a second color space. For example, the first and second color spaces may each comprise one of an RGB color space, a CMYK color space, a CIE Lab color space, a CIE XYZ color space, and an NPac space. The first and/or second color space may be based on these color spaces, e.g. either comprise the color space directly or be a modified version of the space, such as a Yule-Nielsen modified XYZ color space. A color mapping may be implemented by way of a lookup table. The lookup table may comprise nodes, e.g. entries, that map a color value in the first color space to the second color space. In one case, this lookup table may map color values in three dimensions (e.g. RGB space) to NPac values in multiple dimensions (e.g. eight for CMY). Color mappings for values that lie between nodes in the lookup table may be determined using interpolation, e.g. using linear and/or non-linear interpolation.

"Smoothness" of a lookup table may be considered a measure of variance in the entries of the lookup table, e.g. in the color values corresponding to nodes in the lookup table. For example, an LUT with a measurable variance below a predetermined threshold may be considered "smooth". Variance, and therefore smoothness, may be determined by statistical methods. For example, variance may be related to a standard deviation of the entries in the lookup table, e.g. the standard deviation of the output color values mapped to by the lookup table.

The smoothness of a lookup table may directly impact image quality produced by an imaging system utilizing the lookup table. For example, the smoothness of the lookup table may affect color management effectiveness in an imaging process, such as a printing process.

For example, a lack of smoothness of a lookup table may result in a loss of smoothness in the display (or print) output, e.g. where the original color content specifies a gradual, smooth transition of color values, the output may comprise contours that do not smoothly transition, or "blend", as specified in the original color space. An unsmooth mapping between inputs and outputs of a lookup table may also impact color accuracy. For example, the color values in the second color space mapped to by the lookup table may be sampled in an imaging process, and it may be assumed that color management is continuous and smooth between the sampled color values. For example, a printing system may have a color separation lookup table comprising $17^3$ nodes, but an International Color Consortium (ICC) color profile associated with the printing system may be based on a sampling of between $7^3$ and $9^3$ nodes. For example, the lookup table may have a higher resolution than the ICC color profile. Therefore, usefully sampling the lookup table may rely on the color separation being smooth and continuous between the samples taken as part of color management during the printing process.

A direct approach to providing smoothness may involve building a lookup table that has a measurable smoothness above a predetermined threshold, e.g. by defining predetermined individual mappings between corresponding elements in the first and second color spaces. In this respect, defining the predetermined mappings may be a complex and time consuming process, e.g. due to the dimensionality of the first and/or second color space. For example, where the first and/or second color space is an NPac color space, the corresponding dimensionality is defined by the total number of NP states that are available for a given printing system, which in some cases may be in the order of 100,000 states or more.

Accordingly, certain examples described herein relate to a smoothing process applicable to a color lookup table, e.g. in a post-processing stage of an imaging pipeline such as a printing pipeline. Certain examples described herein may enable a color gamut in the first and/or second color space corresponding to the lookup table to be maintained by the smoothing process.

FIG. 1 shows an imaging system 100 according to an example. Certain examples described herein may be implemented within the context of this imaging system. As described above, in examples the imaging system 100 may comprise a printing system, for example a 2D printing system such as an inkjet or digital offset printer, or a 3D printing system, otherwise known as an additive manufacturing system. In the example of FIG. 1, the imaging system 100 comprises an imaging device 110 (e.g. a display device), a memory 120, and an imaging controller 130. The imaging controller 130 may be implemented using machine readable instructions and/or suitably programmed or configured hardware. The imaging device 110 is arranged to produce an image output 140. For example the imaging device 110 may include an electronic visual display such as a liquid crystal display (LCD) or a light emitting diode (LED) display.

In examples where the imaging system 100 comprises a printing system, the imaging device 110 may comprise a printing device arranged to apply, e.g. print, a print material onto a print target in a printing process, for example to produce a print output as the image output 140. The print output may, for example, comprise colored printing fluids deposited on a substrate. The printing device may comprise an inkjet deposit mechanism, which may e.g. comprise a nozzle to deposit the print material. In 2D printing systems, the substrate may be paper, fabric, plastic or any other suitable print medium.

In 3D printing systems, the print output may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder.

The memory 120 is to store a color lookup table (CLUT) 150 comprising entries to map between color spaces. For example, entries of the CLUT 150 may map respective elements in a first color space to corresponding elements in a second color space. The first and second color spaces may each comprise an RGB, CMYK, XYZ, CIE, LAB, YUV, or NPac color space. Elements in the first and second color spaces may comprise vectors in the respective color space. A vector in a color space may comprise components corresponding to values, e.g. coordinates, in the color space, e.g. (234, 122, 63) in RGB space. The vector may therefore comprise a colorimetric value, or point, in a respective color space. A vector in an NPac color space may comprise an NPac vector, as previously described. Where the vectors comprise NPac vectors, the CLUT 150 may be referred to as a "HANS lookup table". When an RGB mapping is used, the HANS lookup table may comprise $17^3$ entries. When a CMYK mapping is used, the HANS lookup table may comprise $9^4$ entries.

The imaging controller 130 (e.g. print controller) is to classify entries of the CLUT 150 into a hierarchy of classes. In examples, the imaging controller 130 may classify an entry of the CLUT 150 into a class in the hierarchy of classes based on a location in the first color space of an element corresponding to the entry. For example, the imaging controller may determine a plurality of categories in the first color space. The categories may correspond respectively to color space characteristics in the first color space, e.g. vertices, edges, faces, volumes, or hyper-volumes of the first color space. For example, characteristics of different dimensionality may be determined in the first color space, and the number of categories may correspond to the overall dimensionality of the first color space. For example, a four-dimensional (4D) color space, such as the CMYK color space, may comprise five categories of color values in the color space, each category corresponding to a dimension of the color space: color values located at a vertex (0D); color values located on an edge or diagonal (1D); color values located on a face (2D); color values located in a volume (3D); and color values located in a hyper-volume (4D).

The imaging controller 130 may classify an entry in the CLUT 150 based on which category of the plurality of categories in the first color space the element corresponding to the entry is located in. As an example, the imaging controller 130 may determine a first category and a second category in the first color space. The imaging controller 130 may classify CLUT 150 entries that correspond with, i.e. map to or from, elements located in the first category into a first class. The imaging controller 130 may classify CLUT 150 entries that correspond with elements located in the second category into a second class. The first and second classes may be hierarchical, for example arranged in a hierarchy.

In examples, each category in the plurality of categories determined by the imaging controller 130 comprises a different dimensionality, e.g. with respect to the first color space, as described above. For example, returning to the above example, the first category in the first color space may comprise a vertex of the first color space. The vertex of the first color space may have a dimensionality of zero, i.e. it is a point in the first color space that does not extend in any dimension. The second category in the first color space may comprise an axis in the first color space, e.g. an edge or a ramp of the first color space. An "edge" of a color space may be a vertex-to-vertex line defining a boundary of the color space. A "ramp" of a color space may be vertex-to-vertex diagonal in the color space. Such categories of the first color space are discussed further below in accordance with example methods.

In examples where the imaging controller 130 is to determine a plurality of categories in the first color space, the hierarchy of classes may correspond respectively to the plurality of categories in the first color space. For example, a first class of CLUT 150 entries may correspond to a first category in the first color space, and a second class of CLUT 150 entries may correspond to a second category in the first color space, as determined by the imaging controller 130. Therefore, entries in the CLUT 150 that correspond to a respective element located in the first category of the first color space may be classified into the first class of entries by the imaging controller 130. Similarly, entries in the CLUT 150 that correspond to a respective element located in the second category of the first color space may be classified into the second class of entries by the imaging controller 130.

In examples where each category in the plurality of categories determined by the imaging controller 130 comprises a different dimensionality, the number of determined categories may correspond to a dimensionality of the first color space. For example, if the first color space were a three-dimensional (3D) RGB color space, the plurality of categories may comprise four categories, each corresponding respectively to a dimensionality of 0, 1, 2, and 3 in the 3D RGB color space. Therefore, in examples where the hierarchy of classes correspond respectively to the plurality of categories, the number of classes in the hierarchy of classes may correspond to the dimensionality of the first color space. For example, if the first color space were a four-dimensional (4D) CMYK color space, the plurality of categories may comprise five categories, each corresponding respectively to a dimensionality of 0, 1, 2, 3, and 4 in the 4D CMYK space. The hierarchy of classes, corresponding respectively to the plurality of categories, may therefore comprise five classes.

The imaging controller 130 is to perform processing to smooth each class in the hierarchy of classes in a sequence according to the hierarchy. For example, where the hierarchy of classes comprises first, second and third classes, the imaging controller 130 may perform processing to firstly smooth the first class, followed by the second class, in turn followed by the third class.

Performing processing to smooth, or "smoothing", each class of CLUT 150 entries may comprise applying a smoothing filter to a given class of CLUT 150 entries. Examples of smoothing filters include a "weighted average" filter, an "inverse weighting" filter, and a Gaussian filter. Smoothing a class of CLUT 150 entries may comprise smoothing each CLUT 150 entry in the class.

As previously described, a given CLUT 150 entry may map a first element in the first color space to a corresponding second element in the second color space. Smoothing the given CLUT 150 entry may comprise updating the second element mapped by the given entry based on other elements in the second color space. For example, the second element may comprise a vector or a colorimetric value in the second color space, e.g. comprising RGB, CMYK or XYZ color values, or NP area coverage values. Other elements in the second color space, e.g. comprising a different vector or colorimetric value in the second color space, may be used to smooth the second element. For example, the vector or colorimetric values corresponding to the other elements in the second color space may be processed, e.g. with the vector or colorimetric value of the second element, to update the vector or colorimetric value of the second element.

The other elements in the second color space that are used to smooth the second element may be selected based on respective locations of correspondingly mapped elements in the first color space relative to the first element. For example, a given element in the second color space may be mapped to a corresponding element in the first color space by a respective CLUT 150 entry. The location of the corresponding element in the first color space, relative to the first element mapped by the given entry, may determine whether the given element in the second color space is used to smooth the second element.

Smoothing of different dimensionalities may be performed. For example, one-dimensional (1D) smoothing may be performed to update the second element mapped by the given entry by using other elements in the second color space that each map to respective elements in the first color space which are located on a same (1D) axis of the first color space as the first element mapped by the given entry. Similarly, two-dimensional (2D) smoothing of the given entry may update the second element mapped by the given entry by using other elements in the second color space that each map to respective elements in the first color space which are located on a same (2D) surface of the first color space as the first element mapped by the given entry. Similarly, three-dimensional (3D) smoothing of the given entry may update the second element mapped by the given entry by using other elements in the second color space that each map to respective elements in the first color space which are located in a same (3D) volume, e.g. an interior volume, of the first color space as the first element mapped by the given entry.

In examples, the processing to smooth each class in the hierarchy of classes, performed by the imaging controller 130, is based on the class being smoothed. For example, the smoothing filter applied to a given class in the hierarchy of classes may depend on the given class, e.g. a characteristic of the given class with respect to the first or second color space. For example, where the classes in the hierarchy of classes are classified based on the dimensionality of categories in the first color space, as previously described, the processing to smooth a given class may depend on the associated dimensionality of the given class. For example, 1D smoothing may be applied to a class of CLUT 150 entries that each map corresponding elements in the first color space located in a 1D category of the first color space (e.g. on a vertex-to-vertex edge). Such a class of CLUT 150 entries may be referred to as a "1D class" in the hierarchy of classes. A 1D class of CLUT 150 entries may comprise CLUT 150 entries that each map corresponding elements in the first color space located in a plurality of defined 1D locations of the first color space (e.g. different vertex-to-vertex edges).

In this way, the hierarchy of classes may comprise a 1D class, a 2D class, a 3D class, and so on. In examples, the 1D class is first smoothed, followed by the 2D class, followed by the 3D class, and so on. In examples, 1D smoothing is applied to the 1D class, 2D smoothing is applied to the 2D class, 3D smoothing is applied to the 3D class, and so on.

CLUT 150 entries that correspond to a lower-dimensional class may be excepted from a higher-dimensional class. For example, a CLUT 150 entry mapping a given element in the first color space which is located (i) on an axis of the first color space, the axis being associated with the 1D class of CLUT 150 entries, and (ii) on a surface of the first color space, the surface being associated with the 2D class of CLUT 150 entries, may be classified in the 1D class of CLUT 150 entries and excluded from the 2D class of CLUT entries 150.

FIGS. 2A to 2D are schematic diagrams showing a first color space 200, e.g. an image color space, in accordance with an example. In this example, the image color space 200 is an RGB color space represented as a cube in a three-dimensional space. In other examples, the image color space may be a CMYK color space, e.g. represented as a hyper-cube in four-dimensional space. The vertices of the cube correspond to primary colors (red: R, green: G, blue: B) and secondary colors (cyan: C, magenta: M, yellow: Y) for the RGB color space, in addition to white (W) and black (K).

In examples, the RGB color space may be defined as a 24-bit color space. Thus, each color in the RGB color space may be defined by a vector (X, Y, Z) where each of X, Y and Z take an 8-bit integer value in the range 0 to 255. Accordingly, black may be defined as (0, 0, 0), white as (255, 255, 255), red as (255, 0, 0), green as (0, 255, 0), blue as (0, 0, 255), yellow as (255, 255, 0), magenta as (255, 0, 255) and cyan as (0, 255, 255).

Figure 3:
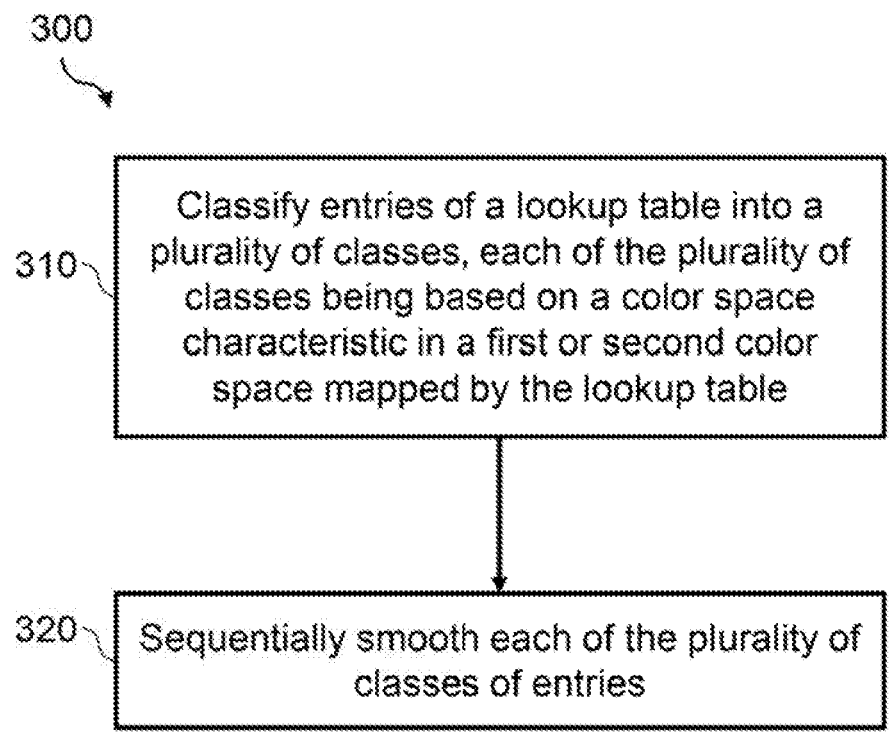
FIG. 3 is a flow diagram showing a method of smoothing a lookup table for an imaging system, according to an example.

FIG. 3 shows a method 300 of smoothing a lookup table for an imaging system. The lookup table (LUT) comprises entries to map elements in a first color space to corresponding elements in a second color space. The LUT may comprise a color lookup table (CLUT) 150 in accordance with examples described previously, e.g. with reference to FIG. 1.

In some examples, the method 300 is performed by an imaging controller, e.g. a print controller such as the imaging controller 130 of FIG. 1. The imaging controller may perform the method based on instructions retrieved from a machine-readable storage medium. The imaging controller may be a component of an imaging system, for example the imaging system 100 of FIG. 1.

At item 310, entries of the LUT are classified into a plurality of classes, each of the plurality of classes being based on a color space characteristic in the first color space or the second color space. For example, classifying a given entry of the LUT into a class of the plurality of classes may be based on a location in the first color space of an element corresponding to the given LUT entry.

At item 320, each of the plurality of classes of LUT entries is smoothed sequentially. For example, the plurality of classes may comprise first, second and third classes of LUT entries. Smoothing the plurality of classes sequentially in this case may comprise smoothing the first class first, then smoothing the second class, and then smoothing the third class. As previously described, smoothing each class of LUT entries may comprise applying a smoothing filter, e.g. a Gaussian filter, to each class of LUT entries. Smoothing a class of LUT entries may comprise smoothing each LUT entry in the class. Alternatively, smoothing a class of LUT entries may comprise smoothing each LUT entry in a subset of LUT entries in the class.

In examples, smoothing a given LUT entry comprises updating the second element mapped by the given entry based on other elements in the second color space. The other elements in the second color space may be selected based on respective locations of correspondingly mapped elements in the first color space, e.g. where a correspondingly mapped element is in the first color space, relative to the first element.

For example, an entry in the LUT may correspond to, e.g. store as part of the LUT data structure, a first color value defined in the first color space 200. For example, the first color value may correspond to a location 205 in the first color space 200 (shown in FIG. 2A). Coordinates of the location 205, defined with respect to the first color space, e.g. RGB coordinates, may be stored in the LUT entry as the first color value. The location 205 of the first color value is on the WY edge of the RGB first color space 200 in this example. The entry may also correspond to, e.g. store, a second color value defined in the second color space. The entry may therefore map the first color value defined in the first color space 200 at the location 205 to the second color value defined in the second color space, e.g. when referenced as part of the LUT during an imaging process. For ease of reference, color values defined in the first color space, or image color space, may hereinafter be termed "image color values." Similarly, color values defined in the second color space, or target color space, may hereinafter be termed "target color values."

Smoothing the LUT entry may comprise updating the second color value (a target color value) using other target color values. For example, the second color value stored by the LUT entry may be updated, e.g. replaced, by a weighted average of a set of target color values. The set of target color values used to update the second color value may be based on the respective locations of image color values to which the set of target color values map. For example, referring to FIG. 2A, the set of target color values used to update the second color value may respectively map to image color values on the same WY edge as the location 205 of the first color value. A separation between a given image color value, e.g. located on the WY edge, and the first color value may determine a respective weighting for the corresponding target color value when used to update the second color value in the LUT entry. For example, an inverse weighting may be applied during the smoothing such that target color values corresponding to image color values that are located further from the first color value in the first color space, e.g. on the WY edge, are weighted less than target color values corresponding to image color values that are located nearer to the first color value in the first color space, e.g. on the WY edge. In other examples, different weightings may be applied to the set of target color values used to update the second color value stored by the LUT entry. The weightings may similarly be based on the respective locations of the image color values (which correspond, i.e. map, to the set of target color values) relative to the first color value in the first color space, e.g. respective separations between them. In some cases, a zero weighting may be applied to the second color value that is to be updated.

In examples, the first color space has three dimensions, e.g. the RGB color space 200 shown in FIGS. 2A to 2D. In these examples, classifying the entries of the LUT into a plurality of classes at item 310 of method 300 involves classifying the entries into four classes. For example, a LUT mapping from a first lookup table having N dimensions may have its entries classified into N+1 classes. Each class of entries may correspond to categories of the first color space having a different dimensionality, as previously described.

For ease of reference, elements defined in the first color space, or image color space, may hereinafter be termed "image elements". Similarly, elements defined in the second color space, or target color space, may hereinafter be termed "target elements".

Figure 2A:
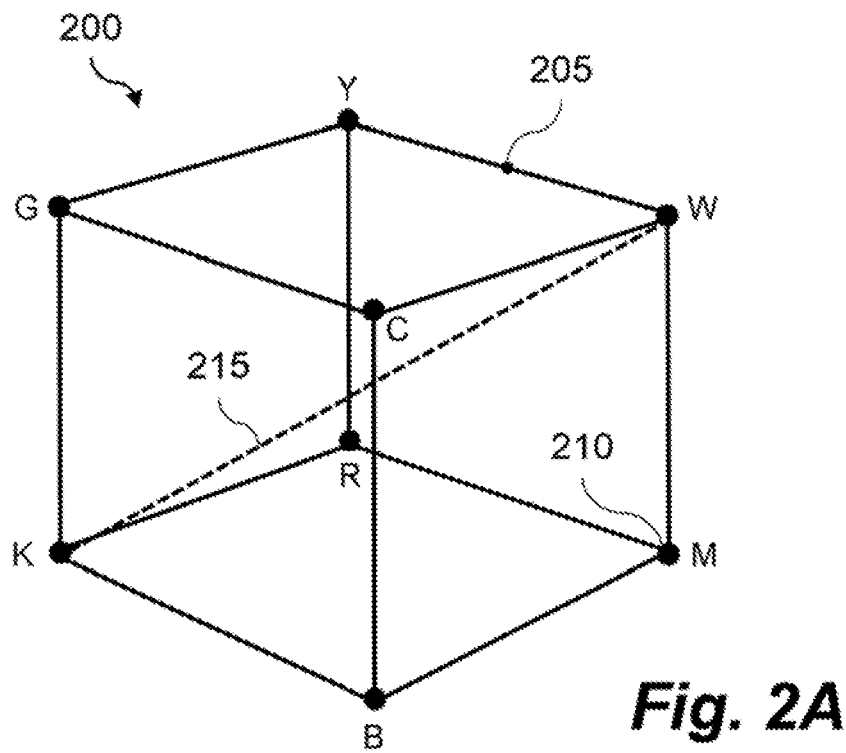
FIGS. 2A to 2D are schematic diagrams showing a first color space according to an example.

In examples, entries of the LUT corresponding to image elements located at a vertex of the first color space are classified into a first class. A vertex of a color space may be a location in the color space where all component coordinates are either at a minimum or maximum in the color space (e.g. at either 0 or 1 when normalized). For example, FIG. 2A shows vertex 210 in the RGB color space 200, corresponding to magenta (M) at normalized (R, G, B) coordinates (1, 0, 1). The other vertices of the RGB color space 200 shown in FIG. 2A, in normalized (R, G, B) coordinates, are: black (K) at (0, 0, 0); white (W) at (1, 1, 1); red (R) at (1, 0, 0); green (G) at (0, 1, 0); blue (B) at (0, 0, 1); yellow (Y) at (1, 1, 0); and cyan (C) at (0, 1, 1). Therefore, in examples where the first color space is the RGB color space 200, entries of the LUT corresponding to image elements located at the K, W, R, G, B, C, M, and Y vertices of the RGB color space 200 are classified into a first class. In examples where the first color space is a color space having n dimensions, the number of vertices in the first color space may be $2^n$. For example, the CMYK color space, having four dimensions, may be represented as a 4D hypercube with $2^4=16$ vertices.

In certain cases, entries of the LUT corresponding to image elements located on a diagonal between a black point and a white point of the first color space are classified in the first class. The white-point of a color space may comprise a set of coordinates in the color space, e.g. a set of tristimulus values, that corresponds to, or defines, the color white (W) in the color space. Similarly, the black point of a color space may comprise a set of coordinates in the color space, e.g. a set of tristimulus values, that corresponds to, or defines, the color black (K) in the color space. For example, in the RGB color space 200 shown in FIGS. 2A to 2D, the black point is at normalized RGB tristimulus values (0, 0, 0) and the white point is at normalized RGB tristimulus values (1, 1, 1). FIG. 2A shows the diagonal 215 between the black point (K) and the white point (W) of the first color space 200. This white-to-black axis, or diagonal, may be termed the "gray ramp" in an image color space 200. In certain examples, the gray ramp may be smoothed separately to other classes of LUT entries. In some cases, the gray ramp may not be smoothed. For example, in some cases, the first class of LUT entries, comprising LUT entries corresponding to elements in the first color space located on the gray ramp, may not be smoothed. Not smoothing LUT entries corresponding to elements in the first color space located on the gray ramp may allow for lightness or darkness of colors mapped between the first and second color spaces to be affected by the smoothing process.

Figure 2B:
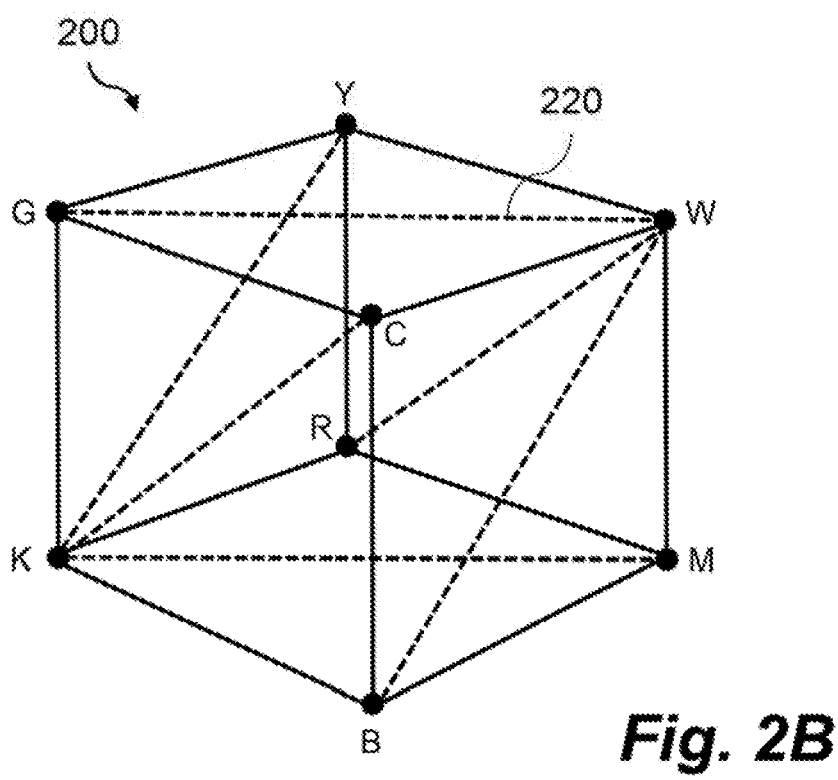

In examples, entries of the LUT corresponding to image elements located on a vertex-to-vertex axis of the first color space are classified into a second class, as described above. Entries already classified into the first class may be excepted from the second class. In examples, a vertex-to-vertex axis of the first color space includes a vertex-to-vertex edge, or a vertex-to-vertex diagonal on a surface of the first color space. For example, FIG. 2B shows vertex-to-vertex edges of the RGB color space 200 in solid lines. As previously described, a vertex-to-vertex edge, or "edge", of a color space may be a line between vertices of the color space that defines a boundary of the color space, e.g. an extent of the color space. FIG. 2B shows vertex-to-vertex diagonals on respective surfaces of the RGB color space 200 in dashed lines. For ease of reference, the diagonals of the first color space on respective surfaces of the first color space may hereinafter be termed "surface ramps" of the first color space. The surface ramps of the first color space may comprise color-to-white ramps between a color vertex of the first color space and the white point of the color space, e.g. the GW diagonal 220 shown in FIG. 2B between the green (G) and white (W) vertices of the RGB color space 200. The surface ramps of the first color space may also comprise color-to-black ramps between a color vertex of the first color space and the black point of the color space, e.g. the MK, CK, and YK ramps shown in FIG. 2B.

Figure 2C:
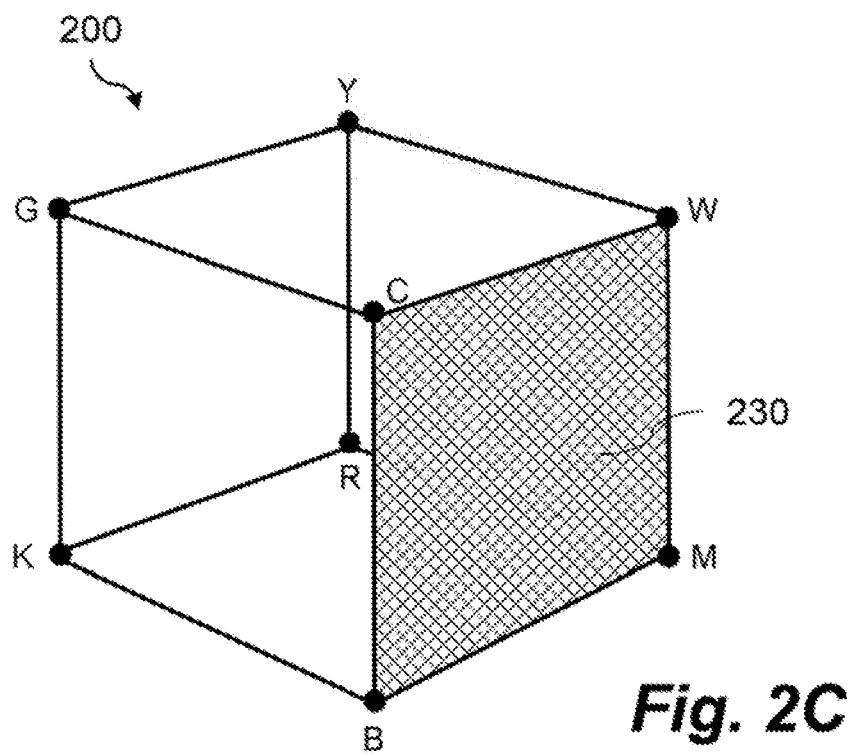

In examples, entries of the LUT corresponding to image elements located on a surface of the first color space are classified into a third class. Entries of the LUT already classified into the first or second classes may be excepted from the third class. In examples, a surface of the first color space comprises a face of the first color space, e.g. a surface of the first color space at a boundary of the first color space. For example, the face may be defined by vertices of the first color space. FIG. 2C shows a surface 230 of the RBG color space 200. The surface 230 in this case is a face 230 defined by the W, C, B and M vertices of the RGB color space 200.

Figure 2D:
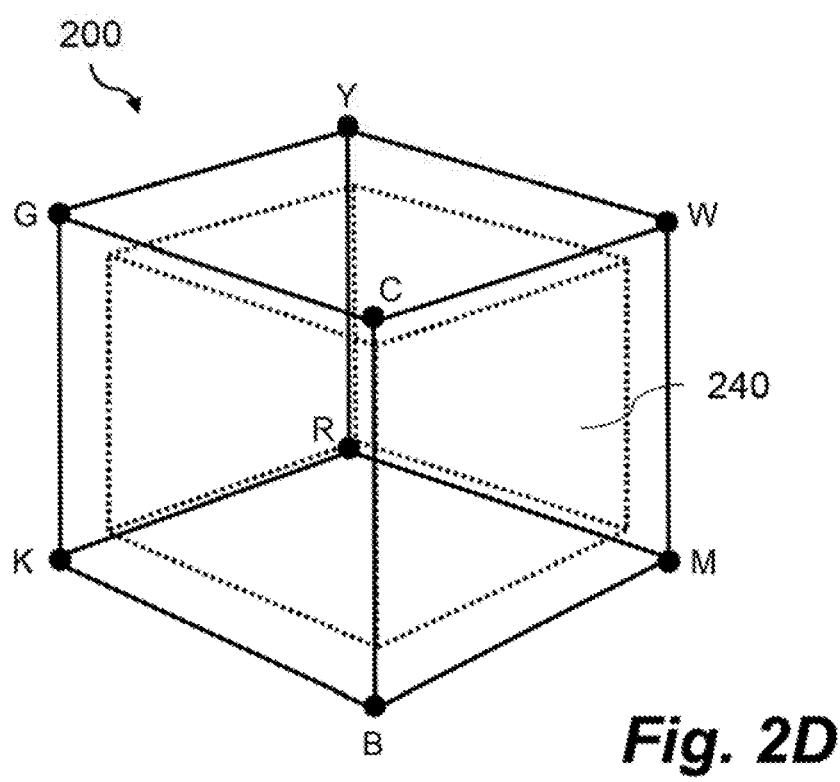

In examples, entries of the LUT corresponding to image elements located in an interior volume of the first color space are classified into a fourth class. Entries of the LUT already classified into the first, second or third classes may be excepted. In some examples, e.g. where the first color space comprises no more than three dimensions (i.e. is 3D), all LUT entries corresponding to image elements not classified into the first, second, or third classes may be classified into the fourth class. FIG. 2D shows an interior volume 240 of the RBG color space 200. In some cases, the interior volume 240 may comprise the entire first color space 200 except for the vertices, edges, and faces of the first color space 200.

In examples, sequentially smoothing each of the plurality of classes of LUT entries involves smoothing the third class of entries after smoothing the second class of entries, and smoothing the fourth class of entries after smoothing the third class of entries. In examples, the first class of LUT entries, corresponding to image elements located at vertices of the first color space, is not smoothed. For example, these LUT entries may be kept the same, e.g. mapping the same image elements to the same target elements, during the smoothing process. In some examples, the second class of LUT entries, corresponding to image elements located on a vertex-to-vertex axis of the first color space, may not be smoothed. For example, image elements located at vertices and/or on vertex-to-vertex axes of the first color space may have been mapped to corresponding target elements in the second color space such that the set of LUT entries corresponding to these image elements are smooth, e.g. when initially building the LUT. In these cases, smoothing may have already been applied to the corresponding LUT entries, and so may not be applied during post-processing of the LUT entries.

In examples where a class of LUT entries is not smoothed as part of the smoothing process, the next class in the plurality, e.g. hierarchy, of classes may be smoothed. For example, where LUT entries corresponding to image elements located at vertices and vertex-to-vertex axes of the first color space are not smoothed, the smoothing process may begin with smoothing the third class of LUT entries corresponding to image elements located on a surface of the first color space.

In examples, smoothing at each stage of the sequence of classes of LUT entries may be performed on a copy of the LUT as it was at the end of the previous stage.

In examples, smoothing a given entry in the second class of LUT entries involves smoothing the target element mapped by the given entry based on other target elements, e.g. a set of target elements. The other target elements may map to corresponding image elements located on a same vertex-to-vertex axis of the first color space as the image element mapped by the given entry. For example, 1D smoothing may be applied to each LUT entry in the second class of LUT entries. Values of target elements that map to image elements located on a same vertex-to-vertex axis of the first color space as the image element corresponding to the LUT entry to be smoothed may be used to update the value of the target element corresponding to, e.g. stored in, the LUT entry.

In examples, smoothing a given entry in the third class of LUT entries involves smoothing the target element mapped by the given entry based on other target elements, e.g. a set of target elements. The other target elements may map to corresponding image elements located on a same surface of the first color space as the image element mapped by the given entry. For example, 2D smoothing may be applied to each LUT entry in the third class of LUT entries. Values of target elements that map to image elements located on a same surface, e.g. face, of the first color space as the image element corresponding to the LUT entry to be smoothed may be used to update the value of the target element corresponding to, e.g. stored in, the LUT entry.

In examples, smoothing a given entry in the fourth class of LUT entries involves smoothing the target element mapped by the given entry based on other target elements, e.g. a set of target elements. The other target elements may map to corresponding image elements located in a same interior volume of the first color space as the image element mapped by the given entry. For example, 3D smoothing may be applied to each LUT entry in the fourth class of LUT entries. Values of target elements that map to image elements located in the same interior volume, e.g. a same subvolume, of the first color space as the image element corresponding to the LUT entry to be smoothed may be used to update the value of the target element corresponding to, e.g. stored in, the LUT entry.

In some examples, the first color space comprises four dimensions. An example 4D color space is the CMYK color space. In these examples, classifying the entries of the LUT into a plurality of classes may include classifying entries of the LUT corresponding, e.g. mapping, to image elements located in a four-dimensional hyper-volume of the first color space into a fifth class. LUT entries already classified into first, second, third, or fourth classes, e.g. as described with reference to the RGB color space 200, may be excepted from the fifth class.

In examples, smoothing a given entry in the fifth class of LUT entries involves smoothing the target element mapped by the given entry based on other target elements, e.g. a set of target elements. The other target elements may map to corresponding image elements located in a same 4D hyper-volume of the first color space as the image element mapped by the given entry. For example, 4D smoothing may be applied to each LUT entry in the fifth class of LUT entries. Values of target elements that map to image elements located in the same hyper-volume of the first color space as the image element corresponding to the LUT entry to be smoothed may be used to update the value of the target element corresponding to, e.g. stored in, the LUT entry.

In alternative examples involving a 4D first color space, the first color space may be represented as a group of eight 3D cubes. For example, instead of classifying LUT entries into the fifth class described above, the fourth class may include eight subclasses corresponding to the eight component 3D cubes of the 4D color space. In this example, 3D smoothing may be applied, as described above with reference to the RGB cube, to each subclass of the fourth class.

Certain methods and systems as described herein may be implemented by a processor that processes computer program code that is retrieved from a non-transitory storage medium.

Figure 4:
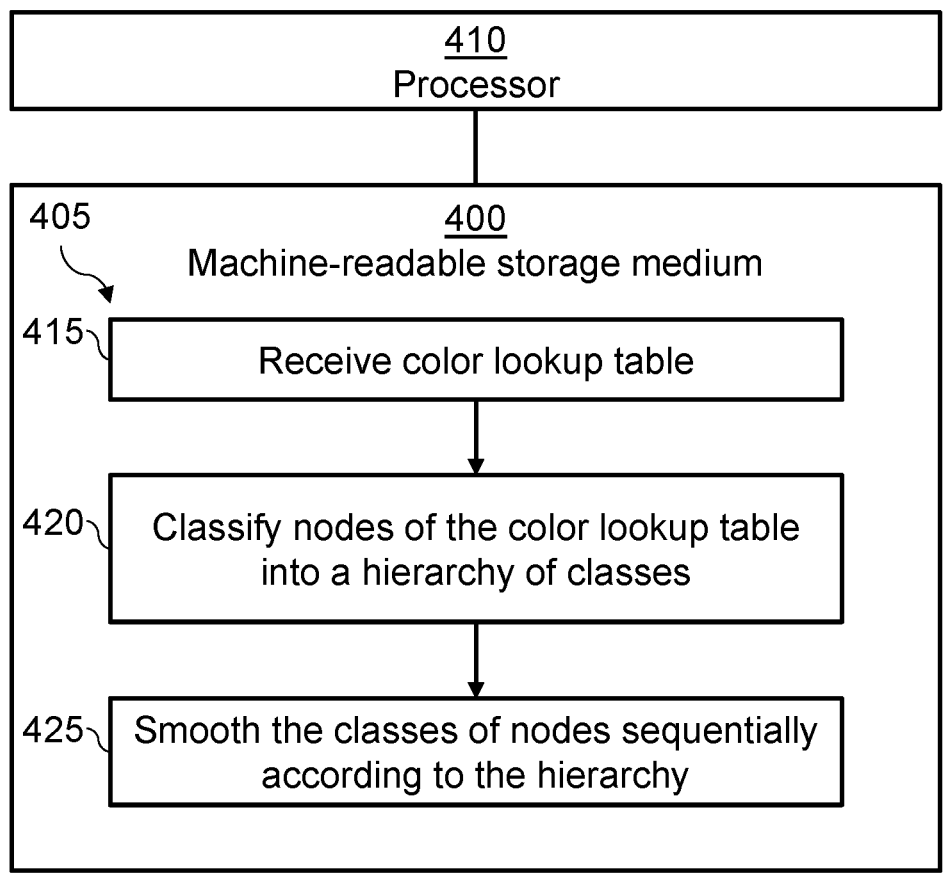
FIG. 4 is a schematic diagram showing a machine-readable storage medium comprising a set of machine-readable instructions and connected to a processor, according to an example.

FIG. 4 shows an example non-transitory machine-readable storage medium 400 comprising a set of machine-readable instructions 405. The machine-readable storage medium 400 is connectably coupled to a processor 410. The processor 410 and the machine-readable storage medium 400 may be components of an imaging system, for example the imaging system 100 described in examples above. The set of machine-readable instructions 405 may be executed by the processor 410.

In the example shown in FIG. 4, instruction 415 instructs the processor 410 to receive a lookup table comprising nodes that map input vectors in a first color space values to output vectors in a second color space. Each node may correspond to a mapping from an input vector to an output vector. The lookup table may comprise a data structure. The nodes may comprise corresponding data entries in the lookup table. The lookup table may comprise a CLUT 150 or LUT according to any of the examples described herein. In certain cases, a lookup table may have a particular number of specific nodes or mappings, wherein interpolation is used outside of these nodes or mappings.

As described herein, a vector in a color space may comprise components corresponding to values, e.g. coordinates, in the color space, e.g. (234, 122, 63) in RGB space. The vector may therefore comprise a colorimetric value, or point, in a respective color space. A vector in an NPac color space may comprise an NPac vector.

Instruction 420 instructs the processor 410 to classify the nodes of the lookup table into a hierarchy of classes. This classification may be performed in accordance with an example described herein.

Instruction 425 instructs the processor 410 to smooth the classes of nodes sequentially according to the hierarchy, e.g. as described in previous examples. For example, the smoothing may be dependent on the class of nodes being smoothed, e.g. a corresponding dimensionality of the class. The hierarchy may therefore define a sequence of the classes of nodes to be smoothed.

In examples, the machine-readable storage medium 400 comprises program code to implement lookup table smoothing techniques and methods described above with reference to FIG. 3.

Processor 410 can include a microprocessor, microcontroller, processor module or subsystem, programmable integrated circuit, programmable gate array, or another control or computing device. The machine-readable storage medium 400 can be implemented as one or multiple machine-readable storage media. Machine-readable media 400 can be any non-transitory media that can contain, store, or maintain programs and data for use by or in connection with an instruction execution system. For example, the machine-readable storage medium 400 may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The machine-readable instructions 405 can be stored on one machine-readable storage medium, or alternatively, can be stored on multiple machine-readable storage media. The machine-readable storage medium 400 or media can be located either in an imaging system, such as a printing system, or located at a remote site from which machine-readable instructions can be downloaded over a network for execution by the processor 410.

According to some examples, the second color space may be defined as material volume coverage space for use in an additive manufacturing apparatus. In such examples, the vector components of a material volume coverage vector (MVoc) represent all materials available to the additive manufacturing apparatus and their combinations. In other words, the MVoc vectors are an enumeration of possible build or deposit states available to the additive manufacturing apparatus. The vector components of the MVoc may be considered analogous to the concept of Neugebauer Primaries as discussed above. In this analogy, each vector component may be considered to comprise a volume coverage of a "material primary". As such the material volume coverage vector has a dimensionality representative of these states and contains the volume coverages (e.g. probabilities) associated with each state. Or in other words, the MVoc comprises weighted combinations or probabilities of material primaries. Thus, according to some examples, the techniques and methods described above with reference to FIG. 3 may be applied to smooth a lookup table for mapping to an MVoc space, e.g. from an image color space, in the additive manufacturing process.

According to some examples, the plurality of classes are based on a color space characteristic in the second color space. For example, LUT entries may be classified based on a location in the second color space of an element corresponding to (e.g. mapped by) the given LUT entry. In examples, LUT entries corresponding to target elements that comprise certain colorant combinations (e.g. black and no other colorant) may not be smoothed, e.g. may be classified into the first class in examples described above.

Examples described herein describe smoothing classes of LUT entries sequentially, e.g. according to a hierarchy of the classes. Classification of the LUT entries may be based on a dimensionality characteristic of the corresponding elements in a first color space mapped by the LUT. The smoothing process applied to a class may correspond to the dimensionality characteristic of the corresponding elements in the first color space mapped by the LUT entries in the class. In this way, a color gamut in the first and/or second color space may be maintained by the smoothing process. For example, the present smoothing methods, by sequentially smoothing the classes of LUT entries, may not affect the color gamut of the mapped color spaces. Similarly, in certain examples neutral colors, i.e. colors on a black-to-white axis or gray ramp, of the mapped color spaces may not be affected by the smoothing methods described.

The preceding description has been presented to illustrate and describe examples of the principles described. This description is not intended to be exhaustive or to limit these principles to any precise form disclosed. Many modifications and variations are possible in light of the above teaching. Although the flow diagram shows a specific order of execution, the order of execution may differ from that which is depicted.

What is claimed is:

1. A method of smoothing a lookup table for an imaging system, the lookup table comprising entries to map elements in a first color space to corresponding elements in a second color space, the method comprising:

classifying the entries of the lookup table into a plurality of classes arranged hierarchically, each of the plurality of classes being based on a color space characteristic in the first color space or the second color space, wherein the hierarchical arrangement is arranged according to importance such that a first class of the plurality of class that is located higher in the hierarchical arrangement has greater importance than a second class of the plurality of classes that is located lower in the hierarchical arrangement relative to the first class; and sequentially smoothing each of the plurality of classes of entries according to the hierarchical arrangement.

2. The method of claim 1 comprising classifying a given entry of the lookup table into a class of the plurality of classes based on a location in the first color space of an element corresponding to the given entry.

3. The method of claim 1, wherein a given entry in the lookup table maps a first element in the first color space to a corresponding second element in the second color space, wherein sequentially smoothing each of the plurality of classes of entries comprises smoothing the given entry, wherein smoothing the given entry comprises updating the corresponding second element mapped by the given entry based on other elements in the second color space, the other elements being selected based on respective locations of correspondingly mapped elements in the first color space relative to the first element.

4. The method of claim 1, wherein the first color space comprises three dimensions, wherein the classifying the entries of the lookup table into a plurality of classes comprises:
classifying first entries of the lookup table corresponding to elements in the first color space located at a vertex of the first color space into a first class;
classifying second entries of the lookup table corresponding to elements in the first color space located on a vertex-to-vertex axis of the first color space into a second class;
classifying third entries of the lookup table corresponding to elements in the first color space located on a surface of the first color space into a third class; and
classifying entries of the lookup table corresponding to elements in the first color space located in an interior volume of the first color space into a fourth class.

5. The method of claim 4, comprising classifying entries of the lookup table corresponding to elements in the first color space located on a black-to-white axis of the first color space into the first class.

6. The method of claim 4, wherein the sequentially smoothing each of the plurality of classes of entries comprises:
smoothing the third class of entries after smoothing the second class of entries; and
smoothing the fourth class of entries after smoothing the third class of entries.

7. The method of claim 4, wherein a given entry in the second class of entries maps a first element in the first color space to a corresponding second element in the second color space, wherein smoothing the given entry comprises smoothing the corresponding second element based on other elements in the second color space, the other elements being mapped to elements in the first color space located on a same vertex-to-vertex axis of the first color space as the first element.

8. The method of claim 4, wherein a given entry in the third class of entries maps a first element in the first color space to a corresponding second element in the second color space, wherein smoothing the given entry comprises smoothing the corresponding second element based on other elements in the second color space, the other elements being mapped to elements in the first color space located on a same surface of the first color space as the first element.

9. The method of claim 4, wherein a given entry in the fourth class of entries maps a first element in the first color space to a corresponding second element in the second color space, wherein smoothing the given entry comprises smoothing the corresponding second element based on other elements in the second color space, the other elements being mapped to elements in the first color space located in a same interior volume of the first color space as the first element.

10. The method of claim 4, wherein the first color space comprises four dimensions, wherein the classifying the entries of the lookup table into a plurality of classes comprises:
classifying entries of the lookup table corresponding to elements in the first color space located in a four-dimensional hyper-volume of the first color space into a fifth class.

11. An imaging system comprising:
an imaging device to produce an image output;
a memory storing a color lookup table comprising entries to map between color spaces; and
an imaging controller to:
classify entries of the color lookup table into a hierarchy of classes, wherein the hierarchy of classes is arranged according to importance such that a first entry of the color lookup table that is located higher in the hierarchy of classes has greater importance than a second entry of the color lookup table that is located lower in the hierarchy of classes relative to the first entry; and
perform processing to smooth each class in the hierarchy of classes in a sequence according to the hierarchy.

12. The imaging system of claim 11, wherein entries of the color lookup table map respective elements in a first color space to corresponding elements in a second color space, wherein the imaging controller is to classify an entry of the color lookup table into a class in the hierarchy of classes based on a location in the first color space of an element corresponding to the entry.

13. The imaging system of claim 12, wherein the imaging controller is to determine a plurality of categories in the first color space, each category in the plurality of categories comprising a different dimensionality, wherein the hierarchy of classes corresponds respectively to the plurality of categories in the first color space.

14. The imaging system of claim 11,
wherein the imaging device comprises a printing device to print material onto a print target, and
wherein the imaging controller comprises a print controller.

15. A non-transitory machine-readable storage medium comprising a set of machine-readable instructions that, when executed by a processor of an imaging system, cause the processor to:

receive a lookup table comprising nodes that map input vectors in a first color space values to output vectors in a second color space;

classify the nodes of the lookup table into a hierarchy of classes, wherein the hierarchy of classes is arranged according to importance such that a first node of the lookup table that is located higher in the hierarchy of classes has greater importance than a second node of the lookup table that is located lower in the hierarchy of classes relative to the first node; and smooth the classes of nodes sequentially according to the hierarchy.

\* \* \* \* \*